(12) United States Patent
Zajac

(10) Patent No.: US 7,748,352 B2
(45) Date of Patent: Jul. 6, 2010

(54) INTERNAL COMBUSTION ENGINE AND METHOD WITH IMPROVED COMBUSTION CHAMBER

(75) Inventor: John Zajac, San Jose, CA (US)

(73) Assignee: Zajac Optimum Output Motors, Inc., San Jose, CA (US)

(*) Notice: Subject to any disclaimer, the term of this patent is extended or adjusted under 35 U.S.C. 154(b) by 481 days.

(21) Appl. No.: 11/457,897

(22) Filed: Jul. 17, 2006

(65) Prior Publication Data

US 2007/0012023 A1 Jan. 18, 2007

Related U.S. Application Data

(62) Division of application No. 11/372,737, filed on Mar. 9, 2006.

(60) Provisional application No. 60/660,045, filed on Mar. 9, 2005, provisional application No. 60/660,046, filed on Mar. 9, 2005, provisional application No. 60/660,050, filed on Mar. 9, 2005, provisional application No. 60/760,478, filed on Jan. 20, 2006, provisional application No. 60/760,641, filed on Jan. 20, 2006, provisional application No. 60/760,642, filed on Jan. 20, 2006.

(51) Int. Cl.
    *F02B 33/00* (2006.01)

(52) U.S. Cl. ............... 123/68; 60/722; 60/752; 60/307; 60/303

(58) Field of Classification Search ............ 165/109.1, 165/38, 42; 123/70 R, 196 AB, 41.42, 41.33, 123/188.9, 299, 68, 300, 301; 92/223; 60/597, 60/303, 307, 620, 712, 622, 722, 752, 39.63; 431/353

See application file for complete search history.

(56) References Cited

U.S. PATENT DOCUMENTS

| 125,166 | A | | 4/1872 | Brayton |
| 708,236 | A | | 9/1902 | Leonard |
| 1,111,841 | A | | 9/1914 | Koenig |
| 1,534,951 | A | | 4/1925 | Hiemer |
| 1,759,425 | A | * | 5/1930 | Suekoff ............ 123/260 |

(Continued)

FOREIGN PATENT DOCUMENTS

| DE | 3242431 A1 | 5/1984 |
| WO | WO 8400997 A1 | 3/1984 |

OTHER PUBLICATIONS

Wikipedia Contributors, Brayton cycle, Publication Date: Unknown, http://en.wikipedia.org/w/index.php?title=Brayton_cycle&oldid=81660788, Wikipedia, The Free Encyclopedia.

*Primary Examiner*—Stephen K Cronin
*Assistant Examiner*—Keith Coleman
(74) *Attorney, Agent, or Firm*—Edward S. Wright

(57) ABSTRACT

Constant pressure internal combustion engine having compression and expansion chambers of variable volume, an elongated combustion chamber of substantially constant volume between the compression and expansion chambers, and a fuel inlet for introducing fuel into the combustion chamber where it mixes with compressed air from the compression chamber to form a mixture of fuel and air that burns as it travels through the combustion chamber. The pressure remains substantially constant within the combustion chamber over a wide range of operating and load conditions.

11 Claims, 8 Drawing Sheets

U.S. PATENT DOCUMENTS

| | | | | |
|---|---|---|---|---|
| 3,577,729 A * | 5/1971 | Warren | | 60/39.63 |
| 3,625,189 A | 12/1971 | Myers et al. | | |
| 3,862,622 A | 1/1975 | Spinnett | | |
| 3,877,229 A * | 4/1975 | Resler, Jr. | | 60/597 |
| 3,932,987 A | 1/1976 | Munzinger | | |
| 3,989,011 A | 11/1976 | Takahashi | | |
| 4,024,704 A * | 5/1977 | Hudson | | 60/39.25 |
| 4,050,420 A | 9/1977 | Cataldo | | |
| 4,074,533 A * | 2/1978 | Stockton | | 60/620 |
| 4,074,671 A | 2/1978 | Pennila | | |
| 4,094,284 A | 6/1978 | Gesell | | |
| 4,133,172 A * | 1/1979 | Cataldo | | 60/39.63 |
| 4,149,370 A | 4/1979 | Ayala Vargas | | |
| 4,200,149 A * | 4/1980 | Pechner | | 165/109.1 |
| 4,336,686 A | 6/1982 | Porter | | |
| 4,458,635 A | 7/1984 | Beasley | | |
| 4,553,385 A | 11/1985 | Lamont | | |
| 4,553,513 A | 11/1985 | Miles | | |
| 4,657,009 A | 4/1987 | Zen | | |
| 5,305,608 A | 4/1994 | Loving | | |
| 5,309,718 A | 5/1994 | Loving | | |
| 5,333,458 A * | 8/1994 | Loving | | 60/722 |
| 5,522,356 A | 6/1996 | Palmer | | |
| 5,566,549 A * | 10/1996 | Clarke | | 60/620 |
| 5,709,188 A | 1/1998 | Al-Qutub | | |
| 6,092,365 A | 7/2000 | Leidel | | |
| 6,305,159 B1 | 10/2001 | Nagel | | |
| 6,318,310 B1 | 11/2001 | Clarke | | |
| 6,789,514 B2 * | 9/2004 | Suh et al. | | 123/70 R |
| 7,047,722 B2 * | 5/2006 | Filippone | | 60/39.182 |
| 7,270,110 B2 * | 9/2007 | Keoppel | | 123/317 |
| 7,271,110 B2 | 9/2007 | Lu et al. | | |
| 7,325,520 B2 | 2/2008 | Zajac et al. | | |
| 7,328,674 B2 | 2/2008 | Zajac et al. | | |
| 7,395,666 B2 * | 7/2008 | Miroslav | | 60/517 |
| 2006/0122762 A1 | 6/2006 | Perkins | | |

* cited by examiner

INTERNAL COMBUSTION ENGINE AND METHOD WITH IMPROVED COMBUSTION CHAMBER

RELATED APPLICATION

Division of Ser. No. 11/372,737, filed Mar. 9, 2006, which claimed the priority of:
Provisional Application No. 60/660,045, filed Mar. 9, 2005;
Provisional Application No. 60/660,046, filed Mar. 9, 2005,
Provisional Application No. 60/660,050, filed Mar. 9, 2005,
Provisional Application No. 60/760,478, filed Jan. 20, 2006,
Provisional Application No. 60/760,641, filed Jan. 20, 2006,
Provisional Application No. 60/760,642, filed Jan. 20, 2006, the priority of which are claimed.

BACKGROUND OF THE INVENTION

1. Field of Invention

This invention pertains generally to internal combustion engines and, more particularly, to an internal combustion engine having an improved combustion chamber and to the method of operation thereof.

2. Related Art

Most internal combustion engines such as typical Otto, Diesel and Wankel engines operate on a change in pressure which is produced by the burning of fuel to produce heat which causes gasses to expand in a confined volume and thereby increase in pressure. That pressure drives the moving parts of the engine to produce motion.

Heretofore, there have been some attempts to design rotary engines which operate at a constant pressure. Examples of such designs are found in U.S. Pat. Nos. 3,862,622, 3,989,011, 4,657,009 and 5,709,188 and in DE 3242431. However, such designs are subject to the problems such as lubrication and sealing which are commonly associated with rotary engines.

OBJECTS AND SUMMARY OF THE INVENTION

It is, in general, an object of the invention to provide a new and improved internal combustion engine and method in which pressure remains substantially constant in the combustion chamber.

Another object of the invention is to provide an internal combustion engine and method of the above character with an improved combustion chamber.

These and other objects are achieved in accordance with the invention by providing a constant pressure internal combustion engine having an elongated combustion chamber which in some embodiments is folded back upon itself and has a rough, twisting interior side wall, a fuel inlet for introducing fuel into the chamber, a compression chamber in which air is compressed and then injected into the combustion chamber to form a mixture of fuel and air that burns continuously as it travels through the combustion chamber, an expansion chamber in communication with the combustion chamber, and an output member in the expansion chamber which is driven by pressure produced by the burning mixture.

Gas flow through the combustion chamber and into the expansion chamber is controlled by valves, and in some embodiments the valves are controlled so that the pressure remains substantially constant within the combustion chamber.

In some embodiments, the combustion chamber has a serpentine shape with a plurality of turns or bends which promote turbulent gas flow through the chamber and further promote complete fuel combustion prior to expansion of the gas into the expansion chamber. In others, the combustion chamber itself is straight, but the passageways which carry the gases to and from the chamber will typically have bends and turns which cause turbulence and thereby promote mixing and burning within the chamber.

In some disclosed embodiments, the combustion chamber has a first section where a mixture of fuel and air can be ignited with an initial air to fuel ratio and a second section in which additional air is added to the mixture to form a leaner mixture. A gas flow separator is provided near the fuel inlet to form one or more smaller volumes within the combustion chamber where the fuel can mix and burn with only a portion of the air introduced into the chamber. Additional air is provided from the compression chamber and mixed with the burning mixture downstream to provide an overall mixture that is effectively leaner. The exact ratios are dependent upon load and the fuel which is being burned, but with gasoline, for example, the air to fuel ratio in the section where ignition occurs can, for example, be on the order of 14:1 to 16:1, and the leaner mixture can have an air to fuel ratio on the order of 14:1 to 160:1. The ratios are preferably such that the temperature in the region where the fuel is injected is above 1400° K so that CO will combine with $O_2$ to form $CO_2$ and thus avoid the production of the pollutant CO.

In some embodiments, the flow separator includes a movable flow divider which can be adjusted continuously to provide any desired distribution of air between sections where fuel is injected and sections where it is not, thereby making it easy to set the burn temperature to any desired power level and to change between different power levels.

Some embodiments also have long, sharp protrusions which extend inwardly from the wall of the combustion chamber and form hot spots which help to provide complete combustion of the fuel mixture throughout the combustion chamber. The protrusions also produce turbulence and thereby further promote complete mixing and burning, and in some embodiments, flow turbulators produce turbulence and promote complete mixing and combustion of the fuel and air.

DETAILED DESCRIPTION

Figure 1:
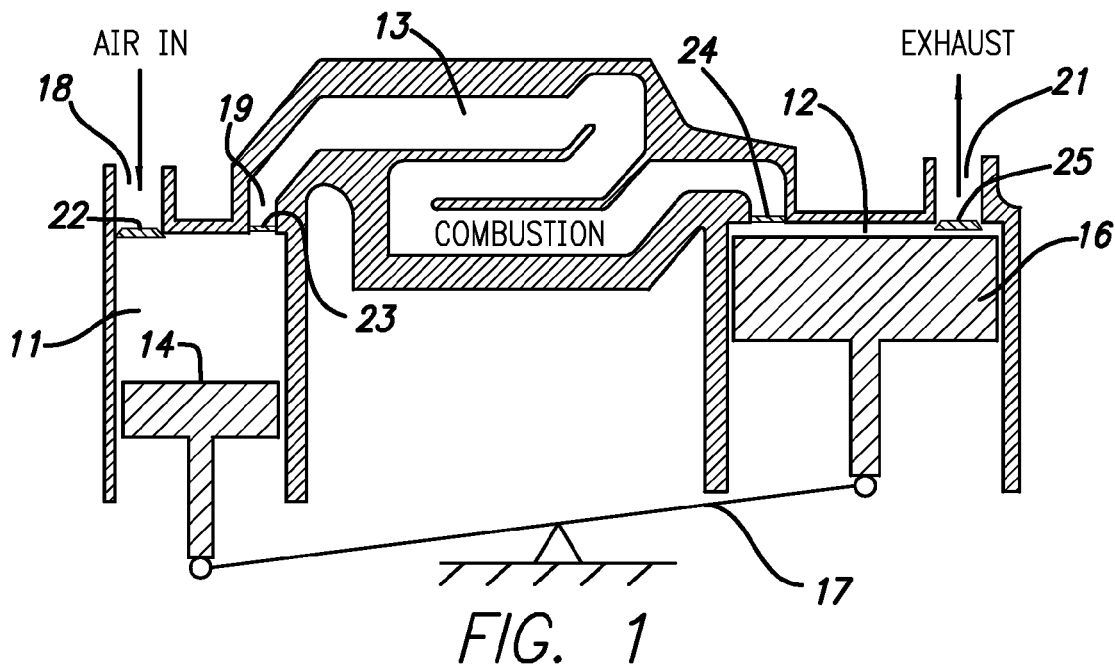
FIG. 1 is a schematic diagram of one embodiment of a constant pressure internal combustion engine with an improved combustion chamber incorporating the invention.

As illustrated in FIG. 1, the engine has a compression chamber 11 and an expansion chamber 12 which communicate with opposite ends of a combustion chamber 13, with reciprocating pistons 14, 16 in the compression and expansion chambers. The pistons are linked together by a crankshaft (shown schematically as a pivoting lever 17) for movement in opposite directions in order to maintain a substantially constant level of pressure in the combustion chamber.

Air is drawn into the compression chamber through an inlet port 18 on the downstroke of piston 14, then compressed and thereby heated on the upstroke of the piston and injected into the inlet end 19 of combustion chamber 13. In the combustion chamber, the hot, compressed air mixes with fuel introduced into the chamber through a fuel inlet to form a mixture which burns throughout the chamber and produces a volumetric increase in the gas. The expander takes out a volume of gas from the combustion chamber which expands to a larger volume than the air or gas the compressor put into the combustion chamber. By controlling the amount of gas that leaves the combustion chamber, the pressure in the combustion chamber can be controlled.

Since expander piston 16 has a larger diameter and surface area than compression piston 14, it is driven in a downward direction with a force corresponding to the difference in the surface areas of the two pistons. Spent gases are expelled through an exhaust port 21 during the upstroke of the expander piston. Communication through the inlet and outlet ports and between the chambers is controlled by valves 22-25.

The sizing of the compression and expansion chambers, the movement of the pistons in them, and the timing of the valves are such that the pressure within the combustion chamber remains substantially constant throughout the operating cycle of the engine, although some pressure spiking can occur and may even be desirable in some cases. In the embodiment illustrated, the difference in size is provided by making the expander piston larger in diameter than the compression piston. However, it could also be done by using a greater number of expander pistons, a longer expander stroke, different valve timing, or a combination thereof.

If desired, the engine can include a control system that has temperature and pressure sensors in the chambers and a computer or other controller responsive to the temperature and pressure sensors for adjusting the timing of the valves and the amount of fuel injected into the combustion chamber. Examples of the use of such sensors and controllers are found in Ser. Nos. 11/372,751 and 11/372,978, both filed Mar. 9, 2006, the disclosures of which are incorporated herein.

The relative sizes of the chambers are such that the combustion chamber is large enough to average out pulses from the compression piston(s) and to reduce the speed at which pressure changes so that the computer and other controls have time to react and maintain control over the process. The combustion chamber preferably has about 10 times the volume of the compressed gas entering the combustion chamber on each revolution of the engine, and in practice, a range of about 1 to 100 is possible. However, very small chambers may be difficult to control, and very large chambers may reduce engine response and add to the cost and size of the engine.

Very large combustion chambers may also increase the amount of heat loss and, thus, reduce overall engine efficiency. Even with a combustion chamber which is the same size as the volume of compressed gas entering the chamber on each revolution of the engine, the combustion time is still longer than it is in a conventional engine where combustion occurs during only one-half of a revolution. The volume of the combustion chamber includes not only the volume of the chamber itself, but also the volumes of the passageways between the two sets of valves that isolate the combustion chamber from the other chambers.

Figure 2:
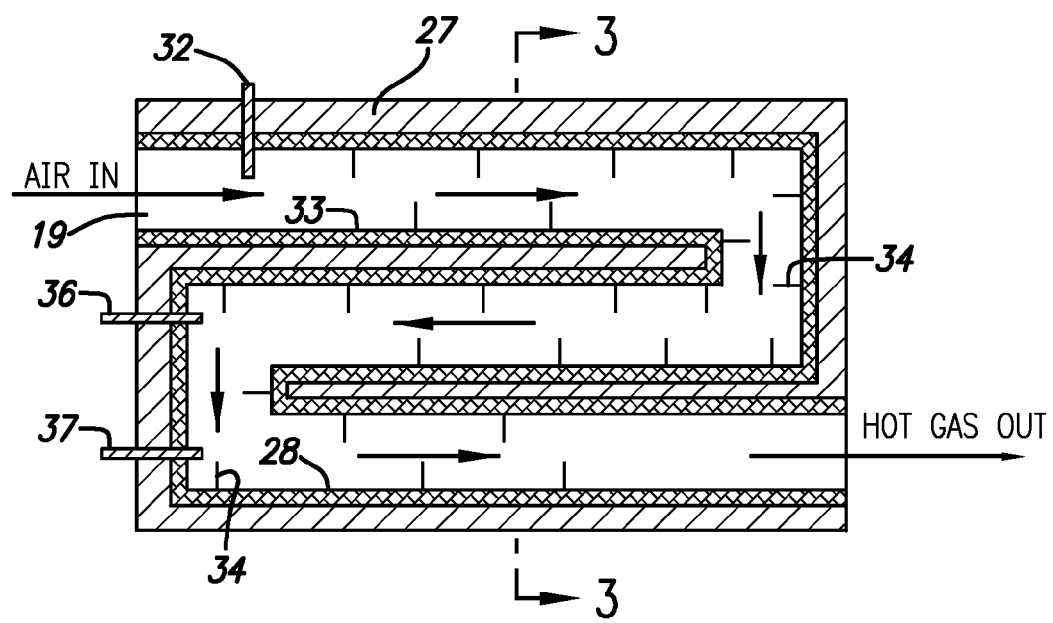
FIG. 2 is a vertical sectional view of the combustion chamber in the embodiment of FIG. 1.
Figure 3:
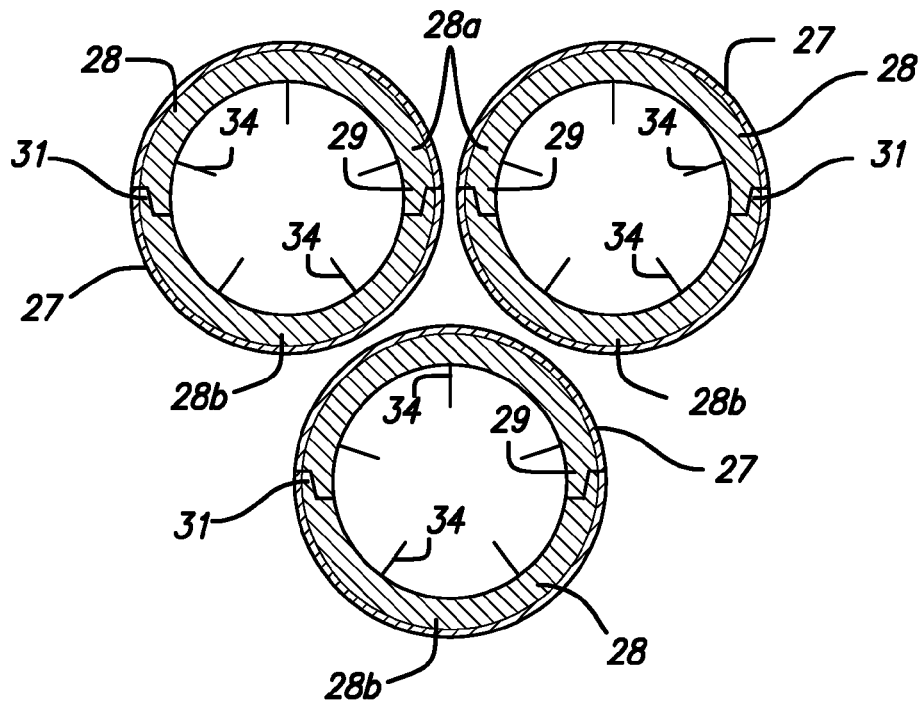
FIG. 3 is a cross-sectional view taken along line 3-3 in FIG. 2.

In the embodiment illustrated in FIGS. 1-3, the combustion chamber has a serpentine shape with a plurality of turns and is in the form of an elongated tube which is folded back upon itself to provide a tortuous, twisting path between the compression chamber and the expansion chamber. It has an outer wall or jacket 27 of structurally strong material such as steel or other suitable metal and/or a composite material and a liner 28 of a thermally insulative ceramic material such as silicon oxide, silicon nitride, aluminum oxide, zirconium oxide, boron nitride, and combinations thereof. The outer jacket provides the strength for containing the pressure within the chamber, and the ceramic liner reduces both radial and axial heat transfer in the chamber walls. In other embodiments, the chamber may have other configurations and may not be folded back upon itself.

Since the engine is designed to operate on the expansion of heated gases rather than an increase in the pressure of the gases, the peak pressure in the combustion chamber can be relatively low compared to typical Otto and Diesel engines. The pressure in the combustion chamber depends to some extent on the compression ratio of the engine and can, for example range from about 270 PSI for an engine with a compression ratio of 8:1 to about 800 PSI for an engine with a compression ratio of 18:1. In some embodiments, the timing for the opening of outlet valve 19 from the compression chamber and inlet valve 24 to the expansion chamber may cause some pressure pulsing. However, the pressure pulses are relatively small due to the relatively large volume of the combustion chamber compared to the volume of air being provided by the compression chamber. Hence, the pulsing will not appreciably affect the efficiency of the engine.

In the embodiment illustrated, the liner is on the order of 0.5 to 2 inches thick and is formed in sections 28a, 28b, with overlapping flanges 29, 31 on opposite sides of the chamber. The flanges fit together loosely so that gases can pass between them to equalize the pressure inside and outside the liner and thereby avoid stresses that might otherwise damage the ceramic material. Alternatively, the liner can be formed with perforations (not shown) for equalizing the gas pressures. It can likewise be formed with a different number of sections which can be joined together by other methods.

A fuel inlet 32 is positioned near the inlet end 19 of the combustion chamber for introducing fuel into the chamber. That fuel mixes with the hot, compressed air which is injected into the chamber from the compression chamber and is ignited by the residual heat of the chamber or by other suitable means such as a glow plug (not shown).

The interior wall 33 of the liner is rough or bumpy to further promote thorough mixing and complete combustion of the fuel and air mixture as it travels through the chamber. In addition, sharp protrusions 34 extend from the wall of the liner into the chamber and create hot spots throughout the chamber, which further ensures complete burning of any fuel injected into the chamber.

The protrusions can, for example, be thin fingers of ceramic or metal wires which are embedded in the liner wall. The protrusions are not cooled, and there is no good path for conducting heat away from them. Consequently, they get hot enough, e.g. 850° K-1700° K, to ignite any unburned fuel that may come into contact with them.

One or more temperature sensors and pressure sensors 36, 37 are provided downstream of the fuel inlet. Temperature in the combustion chamber is thus monitored and controlled so that it never reaches a level where $NO_X$ can form. In that regard, the burn temperature is preferably kept below about 1700° K and is not allowed to go above about 1800° K since that is where $NO_X$ is formed. Information from the pressure sensor is utilized by an onboard microprocessor (not shown) to control valve timing and operation to provide the desired combustion chamber pressure, maximum efficiency as well as ease of starting and engine braking.

Figure 4:
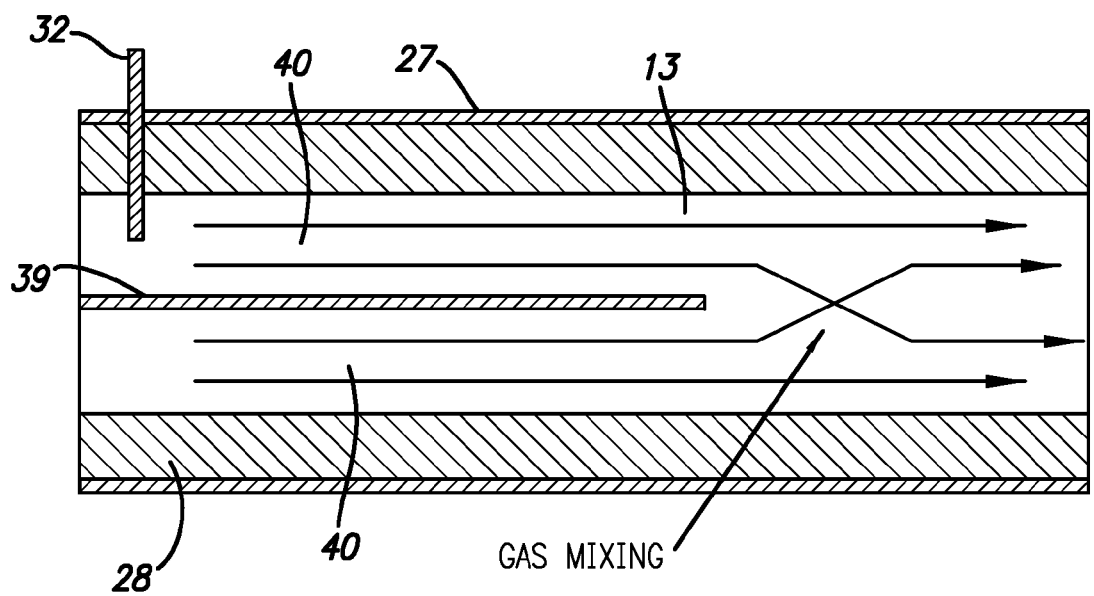
FIG. 4 is a vertical sectional view of another embodiment of a combustion chamber incorporating the invention.

In the embodiment of FIG. 4, a gas flow separator 39 is provided at the inlet end of the combustion chamber where ignition and burning of the fuel/air mixture occur. The separator is in the form of a vane which extends across the chamber and divides the inlet portion of the chamber into two sections or segments 40, with the fuel inlet injecting fuel into only one of them. The fuel is thus mixed and ignited initially with only the portion of the air which is injected into the one section. As the gases travel down the chamber and past the flow separator, the burning mixture is mixed with the air from the other sections, and the resulting mixture has a low average temperature with the effective burn temperature possibly being so low (e.g., below about 1400° K) that carbon monoxide (CO) pollution might otherwise be produced. This has the same effect as burning an extremely lean air/fuel mixture at an extremely low temperature. Thus, the engine will run on lean mixtures with high effective air to fuel ratios which will not burn in other engines, and it will do so without producing pollution.

Figure 5:
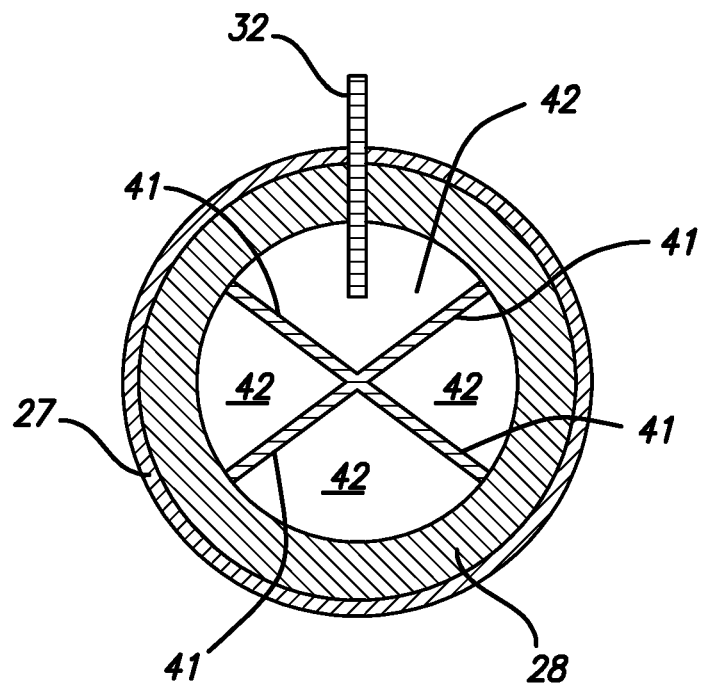
FIGS. 5 and 6 are cross-sectional views of additional embodiments of a combustion chamber incorporating the invention.

In the embodiment of FIG. 5, the separator has four axially extending radial vanes 41 which divide the inlet portion of the chamber into four sections or segments 42, with the fuel inlet injecting fuel into only one of them. Here again, the fuel is mixed and ignited initially with only the portion of the air which is injected into the one section. As the gases travel down the chamber and past the flow separator, the burning mixture is mixed with the air from the other sections.

By way of example, engine fuels will generally burn when the air to fuel ratio is between about 10:1 and 20:1, and with the most common fuels, complete burning occurs with an air to fuel ratio of about 14.6:1. If load conditions require only a 60:1 air to fuel ratio and that amount of fuel were injected into the full inlet region of the combustion chamber, some fuels might not burn, or the burn temperature might not be high enough to allow complete oxidation of carbon monoxide. However, when that same amount of fuel is injected into only one of the four sections of the gas flow separator, then the effective air to fuel ratio in that section is 15:1, and the mixture will burn quite well.

The engine can burn gasoline with almost no limit as to how lean it is. The limit is not in the burning, but rather in the ability of the mixture to provide enough energy to keep the engine idling. In an engine with separators in the combustion chamber where the smallest section receives a 14.6:1 air to fuel mixture and about 10% of the total air flow, the net effect would be equivalent to running with an air to fuel ratio of 146:1. When running at higher power levels, more than one section of the chamber may receive fuel injection, and the actual burn temperature would be kept between 1400° K and 1700° K to reduce air pollution.

With the fuel being mixed and ignited initially with only a portion of the air injected into the chamber, substantially higher overall air to fuel ratios can be used than in other engines. Thus, the engine can run leaner and with high fuel efficiency even under low load conditions such as starting and idling.

The leading edge of the gas flow separator can be in the form of a rod or tube having a greater width or thickness than the rest of the vanes. The discontinuity in the surface of the separator will create vortexes and additional turbulence in the mixture flowing over it, thereby providing more complete mixing of the air and fuel and more complete burning of the fuel.

Rather than dividing the chamber into segments or sections of equal size, the gas flow separator can divide the chamber into sections of any size desired, with fuel being injected into one or more of those sections, as desired or required in a particular application.

Figure 6:
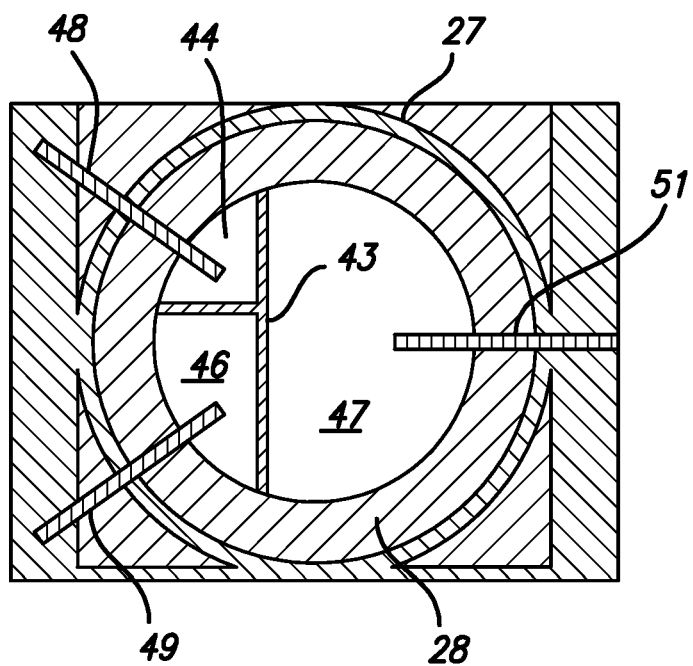

Thus, in the embodiment of FIG. 6, for example, the flow separator 43 divides the inlet portion of the chamber into three sections 44, 46, 47 having cross-sectional areas on the order of 10%, 30% and 60% of the cross-sectional area of the chamber, with fuel injectors 48, 49, 51 for introducing fuel into respective ones of the sections. This particular arrangement is advantageous in that it provides the greatest range of air to fuel ratios for the smallest number of fuel injectors.

If desired, a computer or other controller can be used in conjunction with pressure and/or temperature sensors to adjust the amount of fuel injected into each section as well as the number of sections it is injected into in order to provide the proper air to fuel ratio for particular operating conditions.

Figure 7:
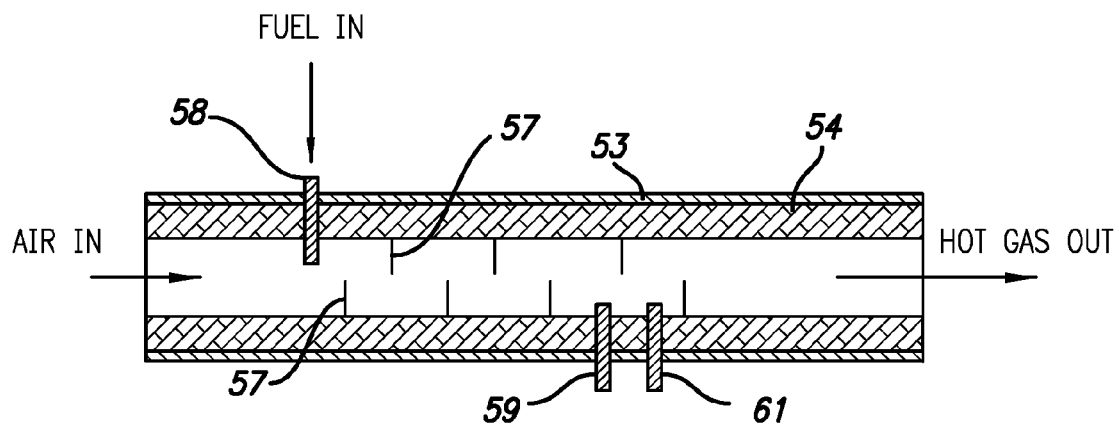
FIGS. 7-9 are vertical sectional views of further embodiments of a combustion chamber incorporating the invention.

The embodiment of FIG. 7 is similar to the embodiment of FIGS. 1-3 except that the combustion chamber is straight, rather than being folded back on itself. It has an outer wall or jacket 53 of structurally strong material such as steel and/or a composite material and a liner 54 of a thermally insulative ceramic material. Except for being straight, outer wall 53 and liner 54 are similar to outer wall 27 and liner 28 in the embodiment of FIGS. 1-3, and the interior wall 56 is rough or bumpy and has sharp protrusions 57 to create local hot spots. A fuel inlet 58 is positioned near the inlet end of the chamber, and temperature and pressure sensors 59, 61 positioned downstream of the fuel inlet.

Figure 8:
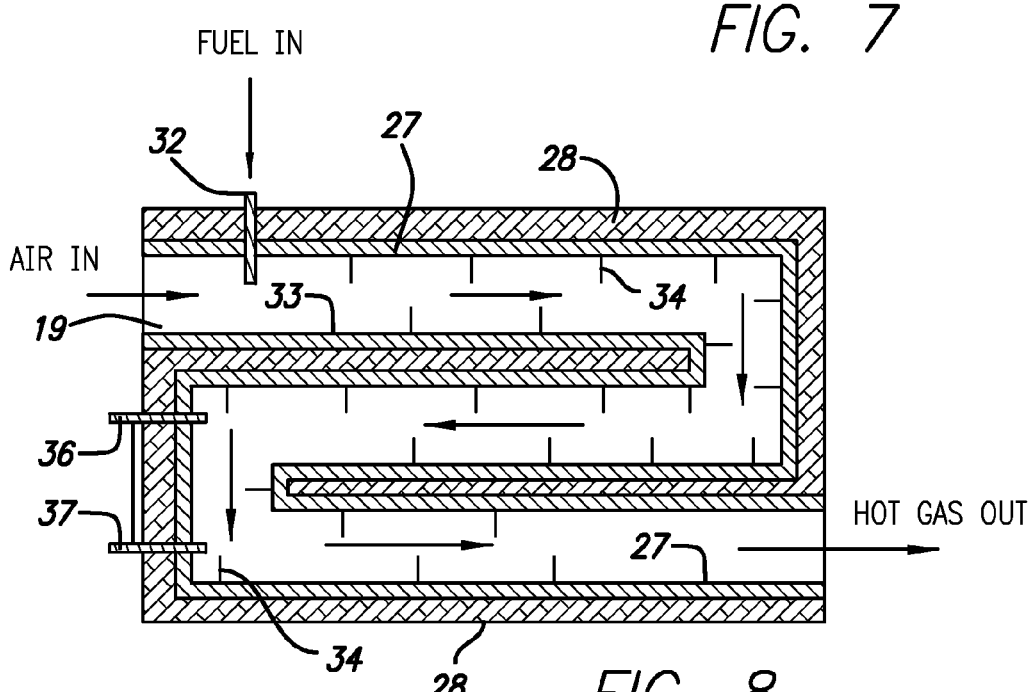

The embodiment of FIG. 8 is also similar to the embodiment of FIGS. 1-3, but in this embodiment, the insulating material 28 is positioned on the outer side of chamber wall 27. The two embodiments are otherwise identical, and like reference numerals designate corresponding elements in them. As in the embodiment of FIGS. 1-3, wall 27 is fabricated of a material which is structurally strong and can also withstand high temperatures, and insulating material 28 is a thermally insulative ceramic material such as silicon oxide, silicon nitride, aluminum oxide, zirconium oxide, boron nitride, and combinations thereof.

Figure 9:
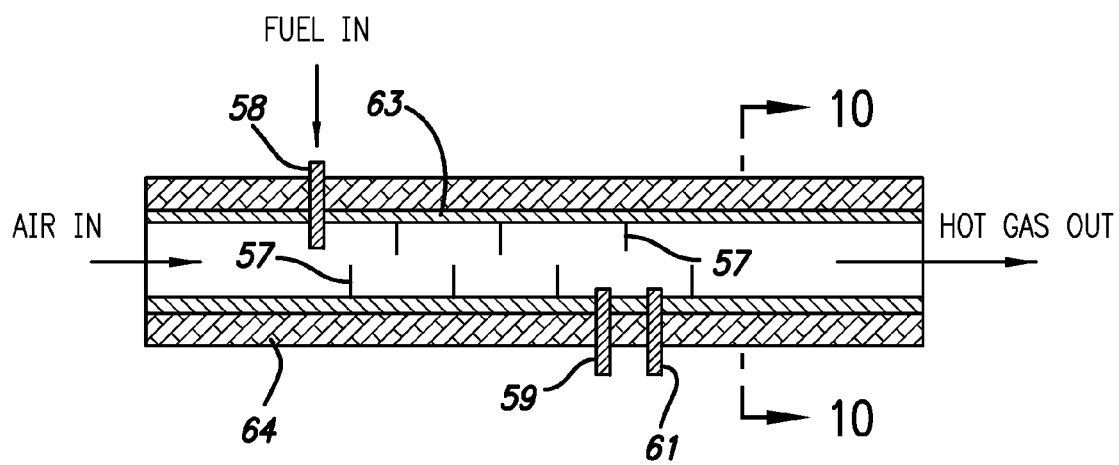
Figure 10:
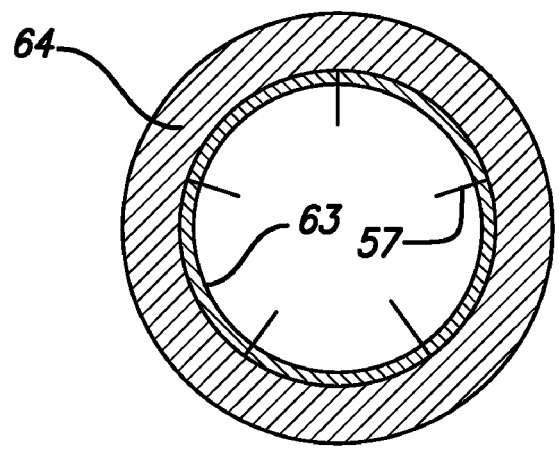
FIG. 10 is an enlarged cross-sectional view taken along line 10-10 in FIG. 9.

In the embodiment of FIGS. 9-10, the chamber has a straight side wall 63, as in the embodiment of FIG. 7, with insulating material 64 on the outer side of the wall, as in the embodiment of FIG. 8. As in that embodiment, wall 63 is fabricated of a material which is structurally strong and can also withstand high temperatures, and insulating material 64 is a thermally insulative ceramic material such as silicon oxide, silicon nitride, aluminum oxide, zirconium oxide, boron nitride, and combinations thereof.

Operation and use of the embodiments of FIGS. 7-10 is similar to that of the embodiment of FIGS. 1-3.

Figure 11:
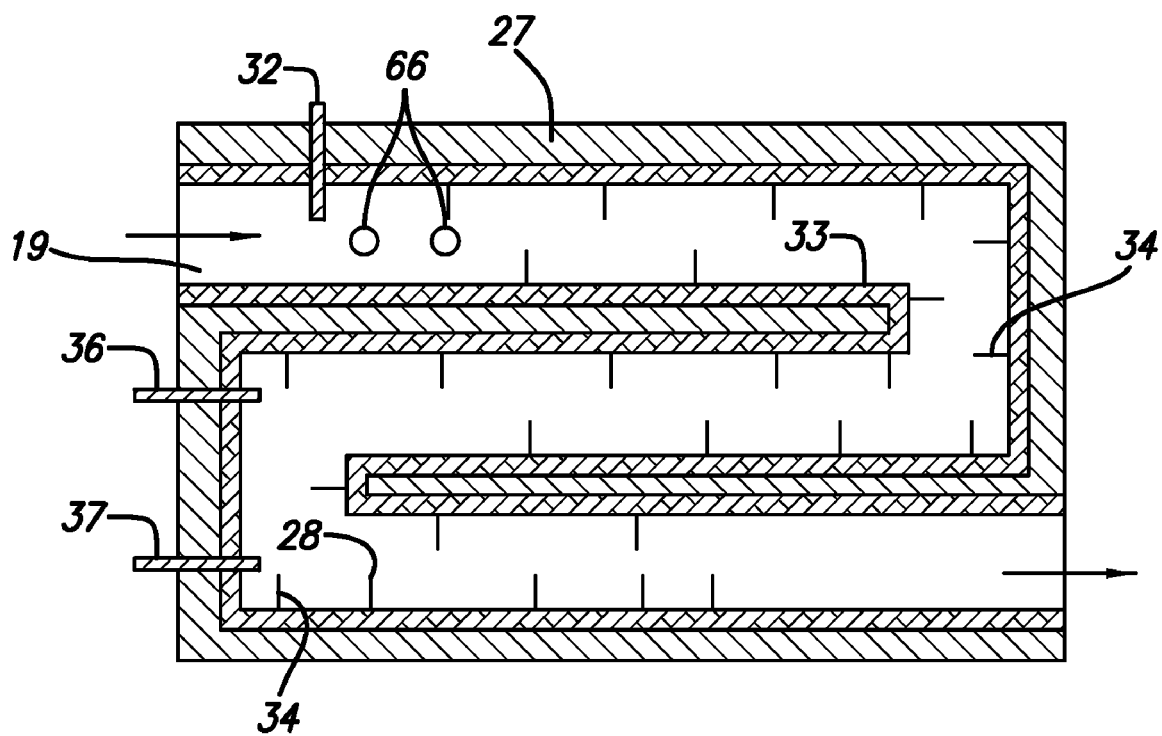
FIG. 11 is a vertical sectional views of another embodiment of a combustion chamber incorporating the invention.

The embodiment of FIG. 11 is similar to the embodiment of FIG. 2, with the addition of turbulators 66 to further promote the turbulence and mixing of the air and fuel within the combustion chamber. In the embodiment illustrated, the turbulators are in the form of elongated rods or cylinders which extend crosswise or transversely of the flow path of the gases within the chamber. It is particularly beneficial to position the turbulators in the region where the fuel enters the chamber so that mixing is maximized before combustion is completed. This serves to limit microscopic maximum burn temperatures and thus helps to reduce the formation of high temperature pollutants such as $NO_x$.

Figure 12A:
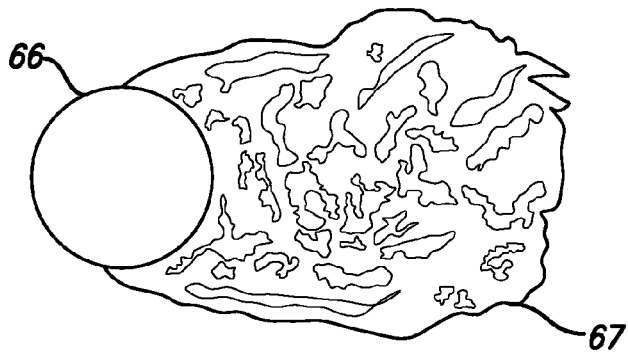
FIGS. 12A-12D are diagrammatic views illustrating turbulence and flow around turbulators of different relative sizes and spacings in the embodiment of FIG. 11.
Figure 12B:
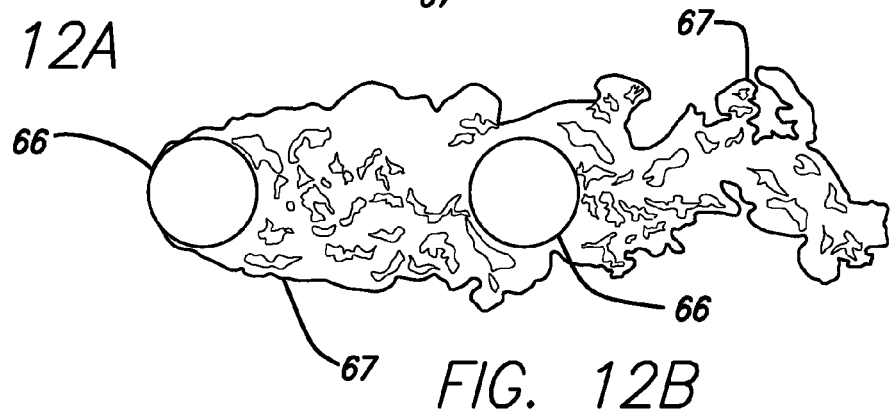

FIG. 12A illustrates the turbulent flow 67 which is produced by a single turbulator 66. The turbulence is even greater if one or more additional turbulators are spaced downstream of the first, as shown in FIG. 12B. The amount of turbulence produced is dependent upon the relative sizes and spacing of the turbulators, and applicant has found that a high level of turbulence and mixing occur when the spacing between the turbulators is at least four times the diameter of the turbulators, i.e. when L/D=4, where L is the center-to-center spacing between the turbulators and D is the diameter of the turbulators.

Figure 12C:
Figure 12D:
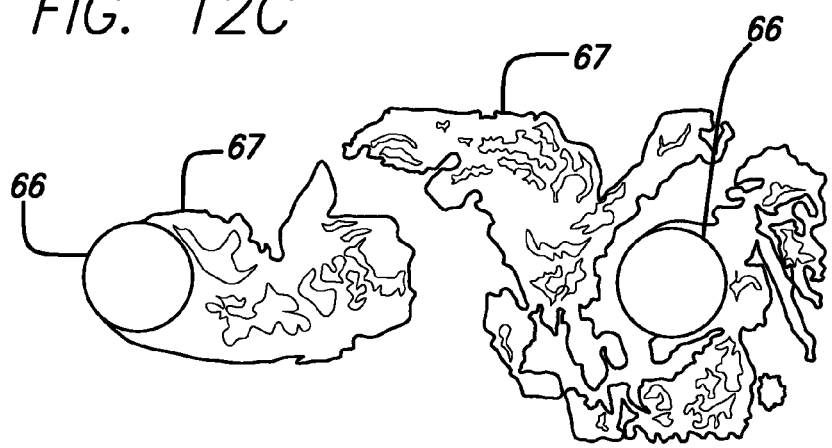

When multiple turbulators are used, the flow that approaches a downstream turbulator from an upstream turbulator is turbulent, with the vortex shedding behind the upstream turbulator being more disturbed as the distance between the two turbulators is decreased until the distance between them is four times the diameter of the turbulators. Such interference causes a change in the characteristics of fluid force and the occurrence of flow-induced mixing The effect of the turbulators on the flow with different spacings between the turbulators is illustrated in FIGS. 12B-12D. In FIG. 12B, L/D=3, and the spacing is too close to permit full shedding of the vortex behind the upstream turbulator. The turbulence and mixing are substantially greater in FIG. 12C where L/D=4, and in FIG. 12D where L/D=5.

Figure 13:
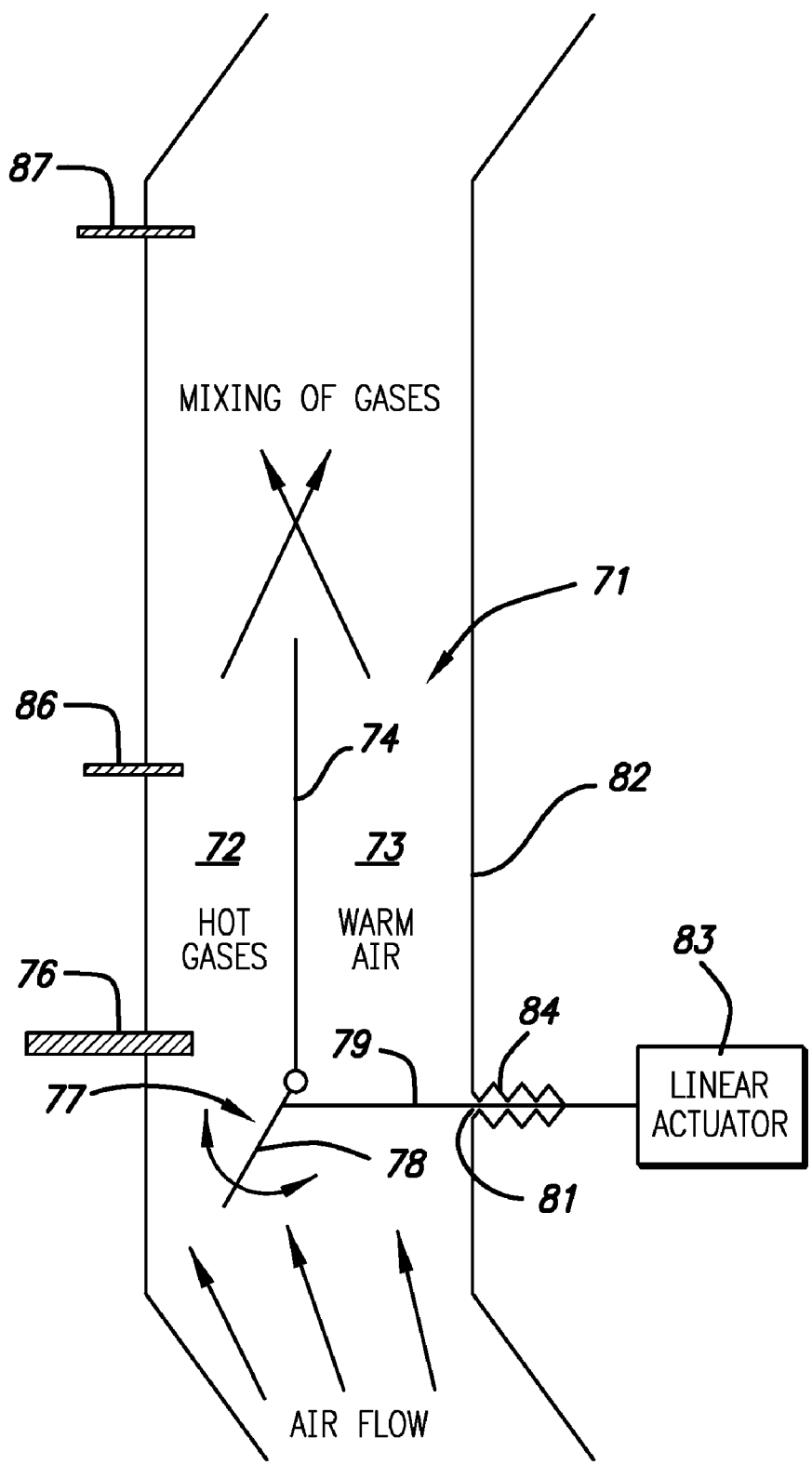
FIGS. 13 and 14 are vertical sectional views of additional embodiments of a combustion chamber incorporating the invention.

In the embodiment of FIG. 13, the inlet portion of the combustion chamber 71 is divided into two sections 72, 73 by a stationary vane 74, and a fuel injector 76 injects fuel into one of the two sections, namely section 72. An adjustable flow divider 77 divides the incoming pressurized air from the compression chamber between the two sections in accordance with the needs of the engine at the time. In this particular embodiment, the flow divider comprises a moving vane 78 which is hingedly mounted to the upstream end of stationary vane 74 for pivotal movement to control the relative sizes of the inlet openings to the two sections.

An operating rod 79 is connected to the moving vane and extends laterally through a small opening 81 in the insulated side wall 82 of the combustion chamber. The outer end of the rod is connected to a linear actuator 83 outside the chamber, and a bellows 84 provides a high temperature seal with the wall of the chamber around the opening. By connecting the actuator rod to the vane at a point close to the hinge, the amount of movement required of both the actuator and the bellows can be minimized.

The bellows is fabricated of a material such as tantalum which can withstand high temperatures. Although the actuator rod may conduct some heat to the bellows from within the chamber, that is not a problem because the moving vane and the rod are in a cooler part of the chamber where temperatures are only about 850° K. In addition, since the bellows is outside the combustion chamber wall, it is protected somewhat by the insulated wall, and it is also cooled by ambient air.

Temperature sensors 86, 87 monitor the temperature in section 72 where the fuel is injected and ignited and also in a region of the chamber which is downstream of the segmented sections and the region where mixing of the burning mixture with the remainder of the air passing through section 73 has occurred. Information from the sensors can be utilized by the computer or other controller to divide the flow to maintain a desired burn temperature.

Figure 14:
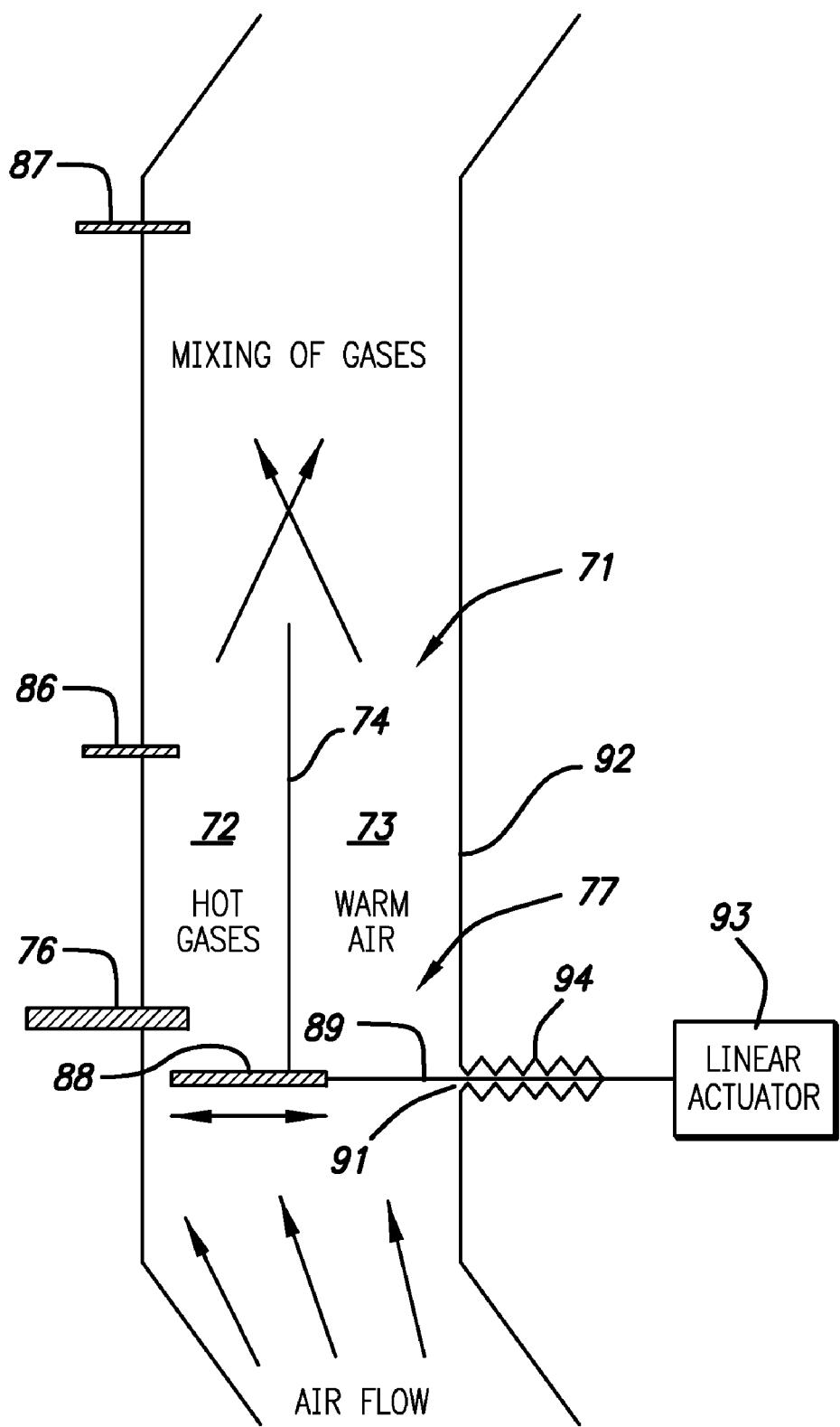

The embodiment shown in FIG. 14 is generally similar to the embodiment of FIG. 13 except that in this embodiment flow divider comprises an adjustable gate in the form of a partition or plate 88 which moves laterally or transversely across the chamber to vary the relative sizes of the air inlets to the two sections. An operating rod 89 is connected to the gate and extends through a small opening 91 in the side wall 92 of the chamber. The outer end of the rod is connected to a linear actuator 93 outside the chamber, and a bellows 94 provides a high temperature seal with the wall of the chamber. The linear movement of the sliding gate provides more linear flow control and requires less moving force than the hinged vane, but it does require a longer movement to go from minimum power to maximum power.

Operation of the embodiments of FIGS. 13 and 14 is similar. In each of them, the relative amounts of pressurized air delivered to each of the two sections is determined by the positioning of the flow divider. The amounts of air available for the initial ignition and for addition downstream combustion can be set very precisely, and the burn temperature can be set to any desired power level as well as being adjusted smoothly and continuously between different power levels.

With the adjustable flow divider, the inlet region of the combustion chamber only needs to be divided into two sections, and only one fuel injector is required to provide essentially infinite control over the burn temperature. Hence, the burn temperature is readily maintained between the maximum and minimum limits which will avoid pollution, as well as being readily set for any desired power level.

In all of the disclosed embodiments, the air going into the combustion chamber is cooler than the air in the combustion chamber or the air coming out of it, and consequently the plumbing going into the combustion chamber can have external insulation rather than internal insulation. Without internal insulation, the diameter of the plumbing can be smaller which can save space and allow for more compact bends.

In addition to preventing the production of NOx and CO, the combustion chamber is also believed to prevent a third form of pollution—unburned hydrocarbons. That chamber has very hot walls which do not quench the flame front, as can happen in engines where combustion occurs in water cooled cylinders. In addition, any fuel which comes into contact with the combustion chamber walls will become vaporized and ignited. Hence, the hot wall is an important feature which has significant advantages.

The invention has a number of important features and advantages. The long, insulated, dedicated combustion chamber with the rough surface walls, the bends at or near the entrance to the chamber, and the flow turbulators serve to completely burn the fuel and heat the operating gas. The chamber is large enough to average out pulses from the compression piston(s) and to reduce the speed at which pressure changes so that the computer and controls have time to react and maintain control over the process.

The size or length of the combustion chamber also affects the amount of time the gases have for complete burning. For example, at 3000 RPM and a combustion chamber having a volume 10 times that of the compressed gases entering the chamber per engine revolution, the gases would have between about 0.1 and 0.2 seconds for ignition and burning, depending upon load. This is a significant improvement over a conventional internal combustion engine running at 3000 RPM with combustion in the cylinders, which has only about 0.01 second to complete combustion. That is an inadequate amount of time for complete burning, and the unburned gases are discharged through the exhaust system as pollutants which may require further processing. In contrast, the time available for ignition and burning in the combustion chamber in the engine of the invention can be much longer (typically on the order of 2 to 100 times longer) than the time available in other engines running at the same RPM.

In the embodiments with the insulative liner in the combustion chamber, the liner prevents the loss of heat which would reduce the efficiency of the engine. It also keeps the metal tube or jacket out of direct contact with the hot gases and avoids the need to use metals such as tungsten or tantalum which have melting points high enough to withstand the temperatures within the chamber, e.g. 1700° K (1425° C.).

The insulative liner also prevents heat transfer or loss along the walls of the chamber in an axial direction as well as in a radial direction. Since the ends of the combustion chamber are connected to other parts of the engine which may be water-cooled, it is important to reduce axial heat loss as much as possible. Thus, the liner provides both radial and axial insulation while allowing common, inexpensive, low temperature metals such as steel to be used for the combustion chamber.

The insulation on the wall of the combustion chamber allows all portions of the chamber to be hot, which prevents fuel from condensing on the chamber wall as it does in Otto and Diesel engines. That helps to further improve fuel efficiency and decreases air pollution since there are no condensed hydrocarbons to be discharged to the atmosphere on the exhaust stroke.

The segmented combustion chamber can burn any fuel with a very lean mixture with air and can maintain the proper temperature range to avoid the production of CO and NOx and unburned hydrocarbons, and in some embodiments, this is accomplished with no moving parts in the hot pressurized combustion chamber.

It is apparent from the foregoing that a new and improved internal combustion engine and method have been provided. While only certain presently preferred embodiments have been described in detail, as will be apparent to those familiar with the art, certain changes and modifications can be made without departing from the scope of the invention as defined by the following claims.

The invention claimed is:

1. An internal combustion engine comprising: a compression chamber, an expansion chamber, a combustion chamber of substantially constant volume providing a tortuous, twisting path between the compression chamber and the expansion chamber, an outlet valve between the compression chamber and the combustion chamber for controlling the flow of gas from the compression chamber to the combustion chamber, a fuel inlet for providing fuel to the combustion chamber, and an inlet valve between the combustion chamber and the expansion chamber for controlling the flow of gas from the combustion chamber to the expansion chamber, wherein the compression chamber is configured to vary in volume and compress gas for delivery to the combustion chamber, the expansion chamber is configured to vary in volume and receive gas from the combustion chamber, the outlet valve allows gas to flow from the compression chamber to the combustion chamber for combustion, and the inlet valve allows gas to flow from the combustion chamber to the expansion chamber after combustion such that a substantially constant pressure is maintained in the combustion chamber over a wide range of operating conditions.

2. An internal combustion engine comprising: a compression chamber, a combustion chamber of substantially constant volume, an outlet valve between the compression chamber and the combustion chamber for controlling the flow of gas from the compression chamber to the combustion chamber, a fuel inlet for providing fuel to the combustion chamber, an expansion chamber, a plurality of protrusions extending within the combustion chamber to form hot spots to promote combustion therein, and an inlet valve between the combustion chamber and the expansion chamber for controlling the flow of gas from the combustion chamber to the expansion chamber, with the outlet valve allowing gas to flow from the compression chamber to the combustion chamber for combustion, and the inlet valve allowing gas to flow from the combustion chamber to the expansion chamber after combustion.

3. The internal combustion engine of claim 1 wherein the pressure in the combustion chamber is in the range of 250 to 1000 PSI.

4. The internal combustion engine of claim 1 wherein the pressure in the combustion chamber varies by less than about 20 percent of the average pressure in the combustion chamber during steady state operation.

5. An internal combustion engine comprising: a compression chamber, a combustion chamber, an outlet valve between the compression chamber and the combustion chamber for controlling the pressure and flow of gas from the compression chamber to the combustion chamber, a fuel inlet for providing fuel to the combustion chamber, an expansion chamber, an inlet valve between the combustion chamber and the expansion chamber for controlling the flow of gas from the combustion chamber to the expansion chamber wherein the compression chamber has a volume which varies in size in cycles to compress gas for delivery to the combustion chamber, and the relative sizes of the compression chamber and the combustion chamber are such that the gas from each compression cycle remains in the combustion chamber longer than it remains in the compression chamber.

6. The internal combustion engine of claim 5 wherein the gas from each compression cycle remains in the combustion chamber at least twice as long as it remains in the compression chamber.

7. An internal combustion engine comprising: a compression cylinder, a piston in the compression cylinder, a combustion chamber, an outlet valve between the compression cylinder and the combustion chamber for controlling the flow of gas from the compression cylinder to the combustion chamber, a fuel inlet for providing fuel to the combustion chamber, an expansion cylinder, a piston in the expansion cylinder, an inlet valve between the combustion chamber and the expansion cylinder for controlling the flow of gas from the combustion chamber to the expansion cylinder, and a crankshaft interconnecting the pistons for reciprocating movement between top and bottom dead center positions in the cylinders wherein the relative sizes of the compression cylinder and the combustion chamber are such the average flow time for gas through the combustion chamber is longer than the upstroke time of the piston in the compression cylinder.

8. The internal combustion engine of claim 7 wherein the average flow time for gas through the combustion chamber is at least twice the upstroke time of the piston in the compression cylinder.

9. An internal combustion engine comprising: a compression cylinder, a piston in the compression cylinder, a combustion chamber of substantially constant volume, an outlet valve between the compression cylinder and the combustion chamber for controlling the flow of gas from the compression cylinder to the combustion chamber, a fuel inlet for providing fuel to the combustion chamber, an expansion cylinder, a piston in the expansion cylinder, an inlet valve between the combustion chamber and the expansion cylinder for controlling the flow of gas from the combustion chamber to the expansion cylinder, and a crankshaft interconnecting the pistons for reciprocating movement between top and bottom dead center positions in the cylinders wherein the volume of the combustion chamber is at least twice the volume of the compression cylinder when the outlet valve opens.

10. The internal combustion engine of claim 9 wherein the volume of the combustion chamber is at least ten times the volume of the compression cylinder when the outlet valve opens.

11. An internal combustion engine, comprising an elongated, closed combustion chamber having a side wall which is folded back upon itself and defines a tortuous path for a mixture of fuel and air traveling through the combustion chamber, a fuel inlet for introducing fuel into the chamber near the inlet end, means separate and apart from the fuel inlet for introducing air into the chamber to form a mixture of fuel and air that burns continuously and builds up pressure as it travels through the closed chamber toward the outlet end, and an expansion chamber having a variable volume and an output member which is driven by the pressure produced by the burning fuel mixture.

\* \* \* \* \*